(12) United States Patent
Kawasaki

(10) Patent No.: US 12,047,202 B2
(45) Date of Patent: Jul. 23, 2024

(54) WIRELESS SYSTEM, RELAY METHOD, AND COMMUNICATION TERMINAL

(71) Applicant: ICOM INCORPORATED, Osaka (JP)

(72) Inventor: Hiroshi Kawasaki, Osaka (JP)

(73) Assignee: ICOM INCORPORATED, Osaka (JP)

( * ) Notice: Subject to any disclaimer, the term of this patent is extended or adjusted under 35 U.S.C. 154(b) by 0 days.

(21) Appl. No.: 17/914,036

(22) PCT Filed: Jul. 20, 2021

(86) PCT No.: PCT/JP2021/027150
§ 371 (c)(1),
(2) Date: Sep. 23, 2022

(87) PCT Pub. No.: WO2022/070566
PCT Pub. Date: Apr. 7, 2022

(65) Prior Publication Data
US 2023/0120663 A1  Apr. 20, 2023

(30) Foreign Application Priority Data

Sep. 30, 2020  (JP) .................................. 2020-166380

(51) Int. Cl.
*H04L 12/66*  (2006.01)
*H04W 88/16*  (2009.01)

(52) U.S. Cl.
CPC ............ *H04L 12/66* (2013.01); *H04W 88/16* (2013.01)

(58) Field of Classification Search
CPC ................................ H04W 88/16; H04L 12/66
See application file for complete search history.

(56) References Cited

U.S. PATENT DOCUMENTS

| 2010/0223363 | A1  | 9/2010  | Sarikaya |
| 2015/0372913 | A1* | 12/2015 | Van de Velde ..... H04L 12/4633 370/392 |
| 2018/0176987 | A1* | 6/2018  | Oda ..................... H04L 12/66 |
| 2019/0007304 | A1* | 1/2019  | Kawasaki ............ H04L 45/742 |
| 2021/0329056 | A1  | 10/2021 | Sonobe |

FOREIGN PATENT DOCUMENTS

| JP | 2012-519401    | 8/2012  |
| JP | 2017-175563 A  | 9/2017  |
| JP | 2020-053837 A  | 4/2020  |
| WO | 2017/006833 A1 | 1/2017  |

OTHER PUBLICATIONS

Office Action of the corresponding JP application No. 2020-166380 mailed Apr. 23, 2024 and English translation thereof.

* cited by examiner

*Primary Examiner* — Nicholas P Celani
(74) *Attorney, Agent, or Firm* — Muncy, Geissler, Olds & Lowe, P.C.

(57) ABSTRACT

A gateway device (30) relays voice communication between a communication terminal to be connected to a closed network (10) and a communication terminal to be connected to a LAN (20). The gateway device (30) includes a closed network communicator (31) connected to the closed network (10), a communication relay (32) to perform encapsulation or decapsulation of data for enabling voice communication between the closed network (10) and the LAN (20), and a LAN communicator (33) connected to the LAN (20).

15 Claims, 14 Drawing Sheets

FIG.7

| PORT | IP ADDRESS | MAC ADDRESS |
|---|---|---|
| LAN | | 00:00:00:00:01:01 |
| LAN | | 00:00:00:00:01:02 |
| ... | ... | ... |
| TUNNEL TN1 | 192.168.0.1 | 00:00:00:00:00:01 |
| TUNNEL TN2 | 192.168.0.2 | 00:00:00:00:00:02 |
| ... | ... | ... |

30, TM1a, TM1b, TM2a, TM2b

WIRELESS SYSTEM, RELAY METHOD, AND COMMUNICATION TERMINAL

TECHNICAL FIELD

The present disclosure relates to a gateway device, a communication terminal, a wireless system, and a relay method.

BACKGROUND ART

Communication terminals to perform voice communication, such as a transceiver and a phone, are connected to each other via a network, such as a local area network (LAN) and a public line, and perform voice communication with each other. In order to enable communication terminals to perform voice communication via different networks, a gateway device is installed between the different networks. An example of such a type of gateway device is disclosed in Patent Literature 1.

The gateway device disclosed in Patent Literature 1, by having a plurality of interfaces, enables, for example, voice communication between a phone connected to a LAN and a transceiver connected to a public line.

CITATION LIST

Patent Literature

Patent Literature 1: Unexamined Japanese Patent Application Publication No. 2020-053837

SUMMARY OF INVENTION

Technical Problem

When the gateway device disclosed in Patent Literature 1 relays voice communication between a phone connected to a LAN and a transceiver connected to a public line, to ensure security, the gateway device needs to have a complex, advanced tunnel communication function represented by layer 2 tunneling protocol/Internet protocol security (L2TP/IPsec).

The present disclosure has been made in consideration of the above-described circumstances, and an objective of the present disclosure is to provide a gateway device, a communication terminal, a wireless system, and a relay method capable of relaying voice communication between communication terminals connected to different networks, with a simple configuration.

Solution to Problem

In order to achieve the above-described objective, a gateway device according to a first aspect of the present disclosure is a gateway device for relaying voice communication between a communication terminal to be connected to a closed network on a public line and a communication terminal to be connected to a local area network and includes:
  a closed network communicator connected to the closed network and configured to perform transmission and reception of closed network data conforming to a communication standard of the closed network;
  a LAN communicator connected to the local area network and configured to perform transmission and reception of LAN data conforming to a communication standard of the local area network; and
  a communication relay to generate the closed network data by performing encapsulation by adding a header for communication in the closed network to the LAN data received by the LAN communicator and generate the LAN data by performing decapsulation by removing a header for communication in the closed network from the closed network data received by the closed network communicator,
  in which the closed network communicator transmits the closed network data generated by the communication relay to the closed network, and
  the LAN communicator transmits the LAN data generated by the communication relay to the local area network.

The communication relay preferably performs the decapsulation on the closed network data transmitted from the communication terminal connected to the closed network via an edge router of the closed network, and
  the communication relay preferably performs the encapsulation on the LAN data addressed to the communication terminal connected to the edge router of the closed network.

The communication relay preferably performs the encapsulation by adding a header for communication in the closed network, the header including a destination Internet protocol (IP) address, a source IP address, and a user datagram protocol (UDP) header.

The gateway preferably further includes
  a data processor to generate the LAN data by performing protocol conversion on the closed network data received by the closed network communicator and generate the closed network data by performing protocol conversion on the LAN data received by the LAN communicator,
  in which the data processor generates the LAN data by performing protocol conversion on the closed network with respect to the closed network data transmitted from a wireless station that is the communication terminal connected to the closed network via a control server on the closed network and configured to control inter-wireless station communication.

A communication terminal according to a second aspect of the present disclosure is a communication terminal connectable to a closed network on a public line and configured to communicate with a communication terminal to be connected to the closed network or a communication terminal to be connected to a local area network that is connected to the closed network via a gateway device and includes:
  a terminal-side communicator connected to the closed network and configured to perform transmission and reception of closed network data conforming to a communication standard of the closed network;
  a data generator to generate LAN data conforming to a communication standard of the local area network, based on data for transmission and generate the closed network data by performing encapsulation by adding a header for communication in the closed network to the LAN data; and
  a data extractor to generate the LAN data by performing decapsulation by removing a header for communication in the closed network from the closed network data received by the terminal-side communicator and extract received data from the LAN data,
  in which the terminal-side communicator transmits the closed network data generated by the data generator to the closed network.

The terminal-side communicator preferably transmits the closed network data generated by the data generator to an edge router of the closed network.

A wireless system according to a third aspect of the present disclosure includes:

any one of the above-described gateway devices;
a closed network-side communication terminal that is any one of the above-described communication terminals to be connected to the gateway device via a closed network on a public line;
a closed network-side control server to perform communication control in the closed network;
a LAN-side communication terminal that is a communication terminal connected to the local area network that is connected to the gateway device and configured to perform voice communication with the closed network-side communication terminal; and
a LAN-side control server to perform communication control in the local area network,
in which, when the closed network-side communication terminal is started, the closed network-side communication terminal acquires network information for performing communication with the LAN-side control server from the closed network-side control server.

A relay method according to a fourth aspect of the present disclosure is a relay method performed by a wireless system including:
a closed network-side communication terminal that is a communication terminal to be connected to a closed network on a public line;
a LAN-side communication terminal that is a communication terminal to be connected to a local area network;
a gateway device to relay voice communication between the closed network-side communication terminal and the LAN-side communication terminal;
a closed network-side control server to perform communication control in the closed network; and
a LAN-side control server to perform communication control in the local area network, and
includes:
an information acquisition step of, when the closed network-side communication terminal is started, the closed network-side communication terminal acquiring network information for performing communication with the LAN-side control server from the closed network-side control server;
a closed network-side communication control step of the closed network-side control server performing communication control in the closed network;
a LAN-side control step of the LAN-side control server performing communication control in the local area network;
a closed network-side transmission-reception step of the gateway device receiving LAN data conforming to a communication standard of the local area network from the local area network, generating closed network data conforming to a communication standard of the closed network by performing encapsulation by adding a header for communication in the closed network to the received LAN data, and transmitting the generated closed network data to the closed network; and
a LAN-side transmission-reception step of the gateway device receiving the closed network data from the closed network, generating the LAN data by performing decapsulation by removing a header for communication in the closed network from the received closed network data, and transmitting the generated LAN data to the local area network.

Advantageous Effects of Invention

According to the present disclosure, since LAN data is generated by decapsulating closed network data and closed network data is generated by encapsulating LAN data, it is possible to provide a gateway device, a communication terminal, a wireless system, and a relay method capable of relaying voice communication between communication terminals connected to different networks, with a simple configuration.

BRIEF DESCRIPTION OF DRAWINGS

FIG. 7 is a diagram illustrating an example of an address table in the embodiment.

DESCRIPTION OF EMBODIMENTS

Figure 1:
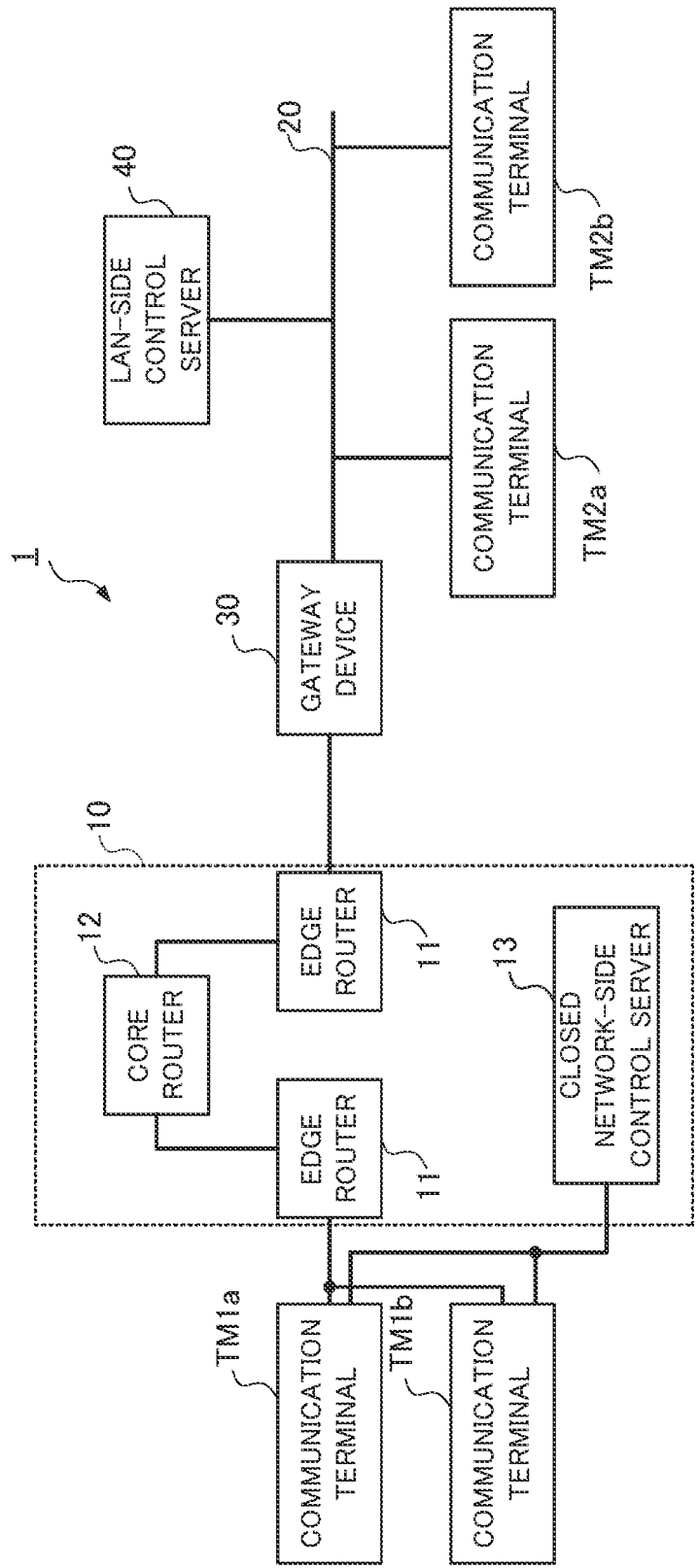
FIG. 1 is a block diagram illustrating a configuration of a wireless system according to an embodiment.

A gateway device, a communication terminal, a wireless system, and a relay method according to an embodiment of the present disclosure are described below in detail with reference to the drawings. Note that the same or equivalent parts are designated by the same reference numerals.

A wireless system 1 illustrated in FIG. 1 enables voice communication between a communication terminal to be connected to a closed network that is provided on a long term evolution (LTE) network that is an example of a public line, and a communication terminal to be connected to a local area network (LAN).

Specifically, the wireless system 1 includes communication terminals TM1a, TM1b, TM2a, and TM2b, a gateway device 30 to be connected to a closed network 10 and a LAN 20, a closed network-side control server 13 to perform communication control in the closed network 10, and a LAN-side control server 40 connected to the LAN 20 and configured to perform communication control in the LAN 20. The communication terminals TM1a and TM1b are closed network-side communication terminals to be connected to the gateway device 30 via the closed network 10. The communication terminals TM2a and TM2b are LAN-side communication terminals connected to the LAN 20 and configured to communicate with the communication terminals TM1a and TM1b, which are closed network-side communication terminals.

Each of the communication terminals TM1a, TM1b, TM2a, and TM2b is a communication device connectable to the closed network 10 or the LAN 20, such as an Internet protocol (IP) phone and an IP transceiver. For example, each of the communication terminals TM1a, TM1b, TM2a, and TM2b is connected to the closed network 10 or the LAN 20 in accordance with an operation by a user. In the example in FIG. 1, each of the communication terminals TM1a and TM1b is connected to the closed network 10 via a not-illustrated base station. Each of the communication terminals TM2a and TM2b is connected to the LAN 20 via a not-illustrated access point. The wireless system 1 enables not only an extension call between the communication terminals TM2a and TM2b, which are connected to the LAN 20 that is a network inside a site, but also an extension call between either the communication terminal TM1a or TM1b, both of which are located outside the site, and either the communication terminal TM2a or TM2b, both of which are located inside the site.

In the closed network 10, edge routers 11 to be connected to communication devices, a core router 12 to relay communication between the edge routers 11, and the closed network-side control server 13 to control communication performed by the communication terminals TM1a and TM1b in the closed network 10 are installed. In the example in FIG. 1, the communication terminals TM1a and TM1b are connected to one of the edge routers 11, which enables radio over Internet protocol (RoIP) communication. The closed network 10 is a virtually closed network that a telecom operator provides. To the closed network 10, only a communication device in which a subscriber identity module (SIM) card that is authenticated in advance is installed can be connected. It is assumed that, in each of the communication terminals TM1a, TM1b, TM2a, and TM2b, a SIM card that is authenticated in advance is installed. To each of the communication terminals TM1a and TM1b connected to the closed network 10, an IP address in the LTE network is assigned.

The LAN 20 is configured using, for example, Ethernet. Each of the communication terminals TM2a and TM2b is connected to the LAN 20 through wireless LAN transceiver connection. The LAN-side control server 40 is connected to the LAN 20.

The gateway device 30 is connected to both the closed network 10 and the LAN 20. The gateway device 30 relays voice communication between the communication terminals TM1a and TM1b that are connected to the closed network 10, and the communication terminals TM2a and TM2b that are connected to the LAN 20.

In the LAN-side control server 40, the communication terminals TM1a, TM1b, TM2a, and TM2b are registered. This registration causes the communication terminals TM1a, TM1b, TM2a, and TM2b to virtually exist in the same network at the layer 2 (L2) level. As a result, each of the communication terminals TM1a, TM1b, TM2a, and TM2b is enabled to download provisioning data including an ID assigned to the communication terminal itself, an address book, and the like from the LAN-side control server 40. The communication terminals TM1a, TM1b, TM2a, and TM2b acquiring provisioning data and updating settings enable the communication terminals TM1a, TM1b, TM2a, and TM2b to perform intra-site wireless communication with one another.

Figure 2:
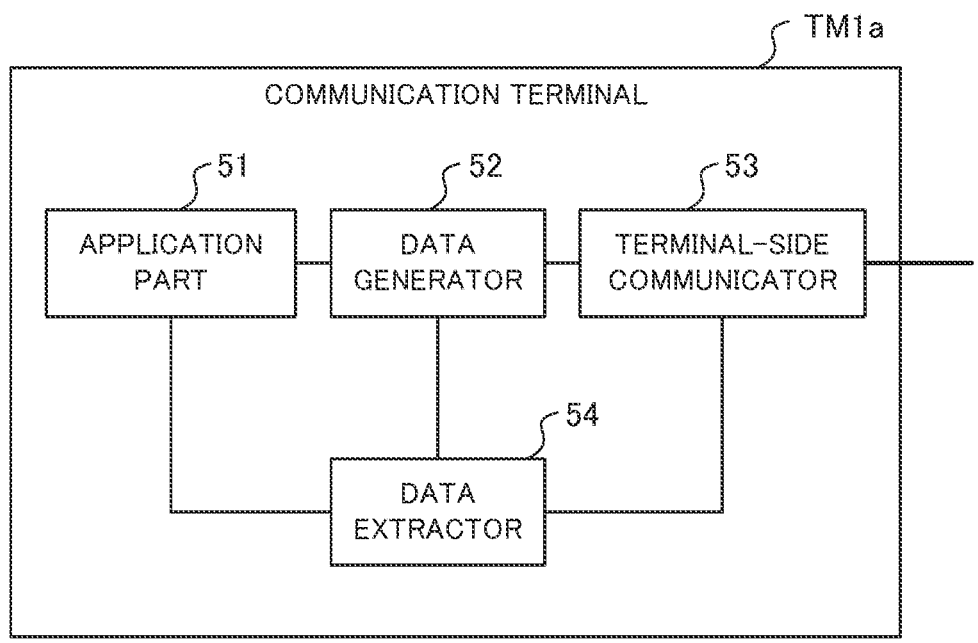
FIG. 2 is a block diagram illustrating a configuration of a communication terminal according to the embodiment.

Since the configurations of the communication terminals TM1a and TM1b are the same as each other, the configuration of the communication terminal TM1a is described below. As illustrated in FIG. 2, the communication terminal TM1a includes an application part 51 to generate data for transmission by performing signal processing on a voice acquired from a microphone, generate a voice by performing signal processing on received data, and output the generated voice from a speaker. The communication terminal TM1a further includes a data generator 52 to generate closed network data, based on data for transmission acquired from the application part 51 and a terminal-side communicator 53 to perform transmission and reception of closed network data to and from the closed network 10. The communication terminal TM1a further includes a data extractor 54 to generate received data from closed network data received by the terminal-side communicator 53.

The application part 51 acquires a voice from the microphone, generates data for transmission by performing signal processing, such as analog-to-digital (A-D) conversion, noise filtering, and amplification, and transmits the generated data for transmission to the data generator 52.

Figure 3:
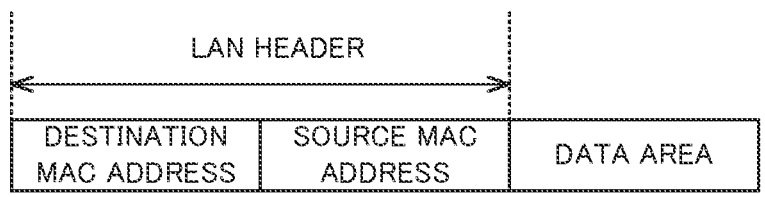
FIG. 3 is a diagram illustrating an example of LAN data in the embodiment.

The data generator 52 generates LAN data conforming to a communication standard of the LAN 20, based on data for transmission. For example, the data generator 52 generates LAN data by adding a LAN header including a destination media access control (MAC) address and a source MAC address to a data area including data for transmission, as illustrated in FIG. 3. When voice communication is performed, the data generator 52 generates LAN data, using data for transmission acquired from the application part 51. On the other hand, when an address resolution protocol (ARP) request or an ARP response is transmitted, the data generator 52 generates LAN data including the ARP request or ARP response in the data area without acquiring data for transmission from the application part 51. The data generator 52 holds a MAC address table in which a MAC address acquired by transmitting an ARP request is stored.

Figure 4:
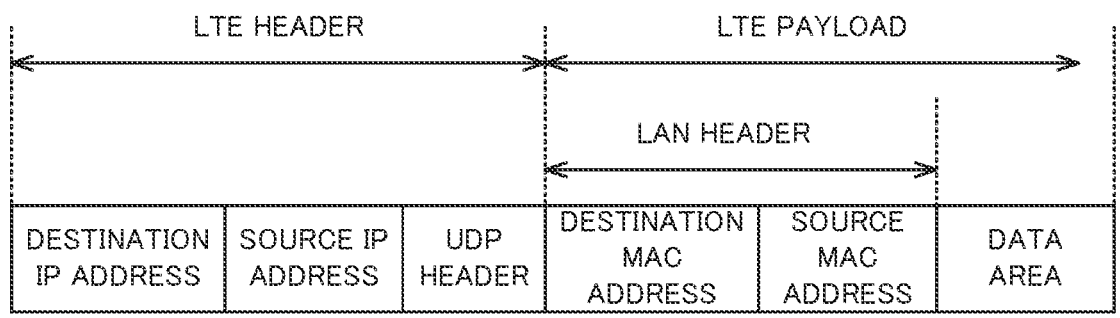
FIG. 4 is a diagram illustrating an example of closed network data in the embodiment.

The data generator 52 generates closed network data conforming to a communication standard of the closed network 10 by encapsulating LAN data. For example, the data generator 52 generates closed network data by performing encapsulation by adding an LTE header including a destination IP address, a source IP address, and a user datagram protocol (UDP) header to LAN data, as illustrated in FIG. 4. In this case, the entire LAN data are included in an LTE payload. The data generator 52 illustrated in FIG. 2 transmits the generated closed network data to the terminal-side communicator 53.

In the communication terminal TM1a, provisioning data that include connection destination information and that are information for enabling voice communication with the communication terminals TM1b, TM2a, and TM2b are downloaded from the closed network-side control server 13 and are reflected on settings. In other words, the communication terminal TM1a holds information about an IP address of the gateway device 30 that is connected to the LAN-side control server 40, which serves as the destination of the registration of the communication terminal TM1*a*, via the LAN 20.

The UDP header includes a source port number and a destination port number. To each of the communication terminals TM1*a*, TM1*b*, TM2*a*, and TM2*b* connected to the closed network 10 or the LAN 20, a port number that uniquely identifies the communication terminal is assigned. The data generator 52 included in the communication terminal TM1*a* performs encapsulation, using the UDP header including the port number assigned to the communication terminal TM1*a*.

The terminal-side communicator 53 is connected to the closed network 10 and performs transmission and reception of closed network data. Specifically, the terminal-side communicator 53 transmits closed network data acquired from the data generator 52 to one of the edge routers 11 of the closed network 10 and transmits closed network data received from the edge router 11 to the data extractor 54. To the terminal-side communicator 53, an IP address in the LTE network is assigned.

The data extractor 54 generates LAN data by decapsulating closed network data. Specifically, the data extractor 54 generates LAN data by performing decapsulation by removing the LTE header from closed network data. The data extractor 54 generates received data by extracting the data area of the LAN data. The data extractor 54 transmits the received data to the application part 51.

Figure 5:
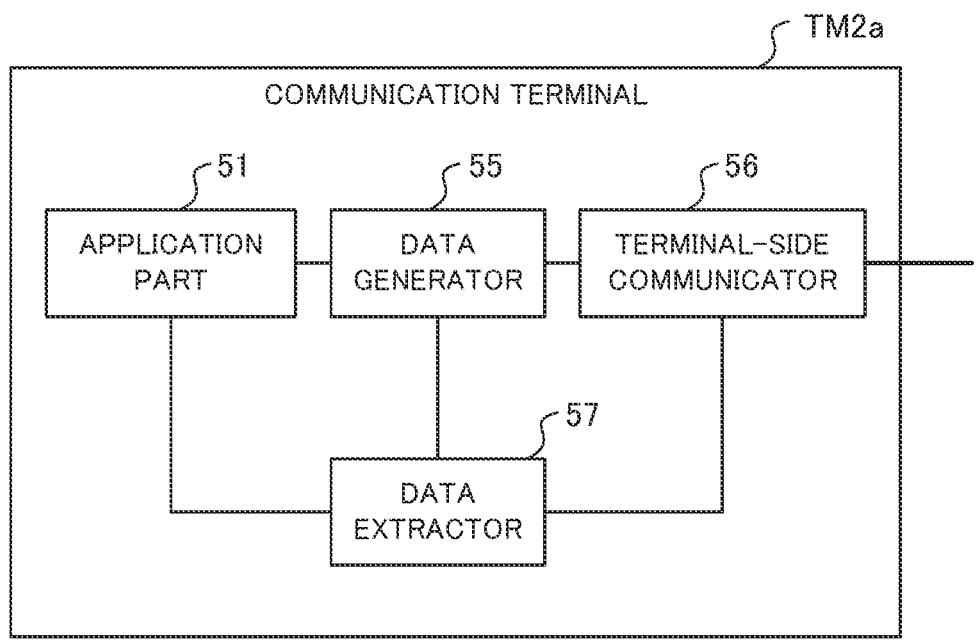
FIG. 5 is a block diagram illustrating a configuration of another communication terminal according to the embodiment.

The communication terminals TM2*a* and TM2*b* that communicate with the communication terminals TM1*a* and TM1*b*, which have the above-described configuration, are described below. The communication terminals TM2*a* and TM2*b* are wireless LAN transceivers that are connectable to the LAN 20. Since the configurations of the communication terminals TM2*a* and TM2*b* are the same as each other, the configuration of the communication terminal TM2*a* is described. As illustrated in FIG. 5, the communication terminal TM2*a* includes an application part 51 included in the communication terminal TM1*a* illustrated in FIG. 2. The communication terminal TM2*a* further includes a data generator 55 to generate LAN data, based on data for transmission acquired from the application part 51, a terminal-side communicator 56 to perform transmission and reception of LAN data to and from the LAN 20, and a data extractor 57 to generate received data from LAN data received by the terminal-side communicator 56, as illustrated in FIG. 5.

The data generator 55, as with the data generator 52, generates LAN data conforming to the communication standard of the LAN 20, based on data for transmission. When an ARP request or an ARP response is transmitted, the data generator 55, as with the data generator 52, generates LAN data including the ARP request or ARP response in the data area without acquiring data for transmission from the application part 51. The data generator 55 holds a MAC address table in which a MAC address acquired by transmitting an ARP request is stored.

In the communication terminal TM2*a*, provisioning data that include connection destination information and that are information for enabling voice communication with the communication terminals TM1*a*, TM1*b*, and TM2*b* are downloaded from the LAN-side control server 40 and are reflected on settings.

The terminal-side communicator 56 is connected to the LAN 20 and performs transmission and reception of LAN data. Specifically, the terminal-side communicator 56 transmits LAN data acquired from the data generator 55 to the LAN 20 and transmits LAN data received from the LAN 20 to the data extractor 57. To the terminal-side communicator 56, an IP address in the LAN 20 is assigned.

The data extractor 57 generates received data by extracting the data area from LAN data acquired from the terminal-side communicator 56. The data extractor 57 transmits the received data to the application part 51.

Figure 6:
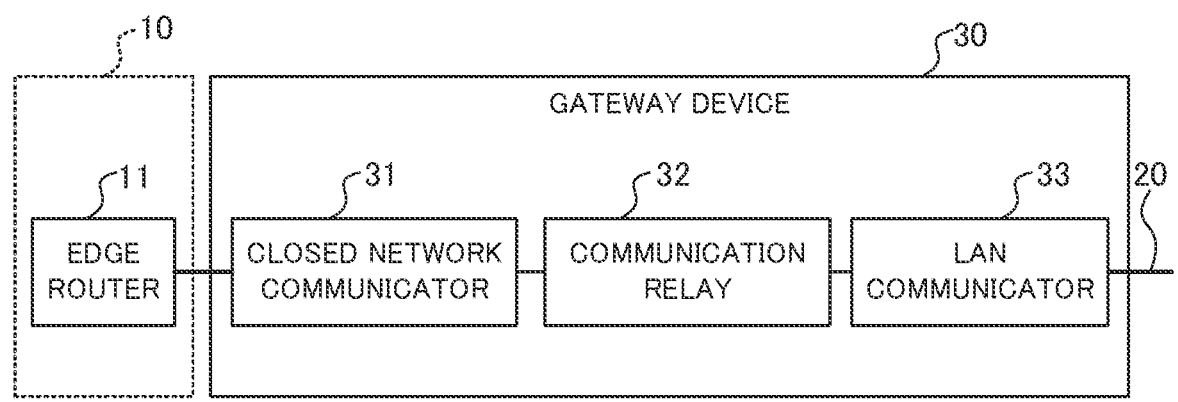
FIG. 6 is a block diagram illustrating a configuration of a gateway device according to the embodiment.

The communication terminal TM1*a* that is connected to the closed network 10, and the communication terminal TM2*a* that is connected to the LAN 20, communicate with each other via the gateway device 30. As illustrated in FIG. 6, the gateway device 30 includes a closed network communicator 31 to be connected to the closed network 10, a communication relay 32 to perform data encapsulation or decapsulation for enabling voice communication between the closed network 10 and the LAN 20, and a LAN communicator 33 to be connected to the LAN 20.

The closed network communicator 31 is connected to the closed network 10 and performs transmission and reception of closed network data. To the closed network communicator 31, an IP address in the LTE network is assigned. The closed network communicator 31 transmits received closed network data to the communication relay 32.

The LAN communicator 33 is connected to the LAN 20 and performs transmission and reception of LAN data. To the LAN communicator 33, an IP address in the LAN 20 is assigned. When a destination MAC address that LAN data received via the LAN 20 include is not the MAC address of the device itself, that is, not the MAC address of the gateway device 30, the LAN communicator 33 transmits the received LAN data to the communication relay 32.

The communication relay 32 generates LAN data by performing decapsulation by removing the LTE header from closed network data acquired from the closed network communicator 31. The communication relay 32 transmits the generated LAN data to the LAN communicator 33. The communication relay 32 generates closed network data by performing encapsulation by adding an LTE header to LAN data acquired from the LAN communicator 33. The communication relay 32 transmits the generated closed network data to the closed network communicator 31. In a not-illustrated storage device included in the gateway device 30, an address table illustrated in FIG. 7 is stored. The communication relay 32, referring to the address table, sets an IP address corresponding to the destination MAC address of the LAN data, in the LTE header.

The LAN-side control server 40 accepts registration of the communication terminals TM1*a*, TM1*b*, TM2*a*, and TM2*b*. The LAN-side control server 40 transmits provisioning data to the registered communication terminals TM1*a*, TM1*b*, TM2*a*, and TM2*b*. When, after accepting registration, the LAN-side control server 40 receives, from one of the communication terminals TM1*a*, TM1*b*, TM2*a*, and TM2*b*, LAN data that includes, in the data area, destination information including an ID of one of or a group ID of some of the communication terminals TM1*a*, TM1*b*, TM2*a*, and TM2*b*, the LAN-side control server 40 transmits the LAN data to one or some of the communication terminals TM1*a*, TM1*b*, TM2*a*, and TM2*b* that the ID or the group ID identifies.

The wireless system 1 establishes an LTE tunnel that is a virtual path for transmitting and receiving a packet in the LTE network, between each of the communication terminals TM1*a* and TM1*b* and the gateway device 30, in such a manner as described below. The establishment of LTE tunnels specifically means that the gateway device 30 recognizes an IP address assigned to each of the communication terminals TM1a and TM1b and it becomes possible to communicate with the communication terminals TM1a and TM1b.

When the communication terminals TM1a and TM1b are started, the communication terminals TM1a and TM1b acquire network information from the closed network-side control server 13 for performing communication with the LAN-side control server 40, which is the destination of the registration of the communication terminals TM1a and TM1b. The network information includes, for example, the IP address in the LTE network of the gateway device 30 that is connected to the LAN-side control server 40 via the LAN 20, communication port information, the IP address of the LAN-side control server 40, and the like. The communication port information indicates, for example, a port for transmitting a keep-alive packet, a port for transmitting closed network data generated by encapsulating LAN data, a port for communication control, or the like. Each of the communication terminals TM1a and TM1b sends keep-alive packets to the gateway device 30 via the closed network 10 at a predetermined interval. This configuration causes the gateway device 30 to recognize the IP addresses in the LTE network assigned to the communication terminals TM1a and TM1b.

The gateway device 30 stores a port number indicating a tunnel TN1 that is an LTE tunnel established between the communication terminal TM1a and the gateway device 30 and the IP address of the communication terminal TM1a in association with each other in the address table illustrated in FIG. 7. The gateway device 30 stores a port number indicating a tunnel TN2 that is an LTE tunnel established between the communication terminal TM1b and the gateway device 30 and the IP address of the communication terminal TM1b in association with each other in the address table illustrated in FIG. 7.

When the gateway device 30 receives LAN data from either the communication terminal TM2a or TM2b to either the communication terminal TM1a or TM1b after transmission and reception of ARP requests and ARP responses are completed, the gateway device 30 is able to recognize the MAC addresses of the communication terminals TM2a and TM2b. The gateway device 30 stores a port number indicating the LAN20 and the MAC address of the communication terminal TM2a in association with each other in the address table illustrated in FIG. 7. The gateway device 30 stores the port number indicating the LAN20 and the MAC address of the communication terminal TM2b in association with each other in the address table illustrated in FIG. 7.

Figure 8:
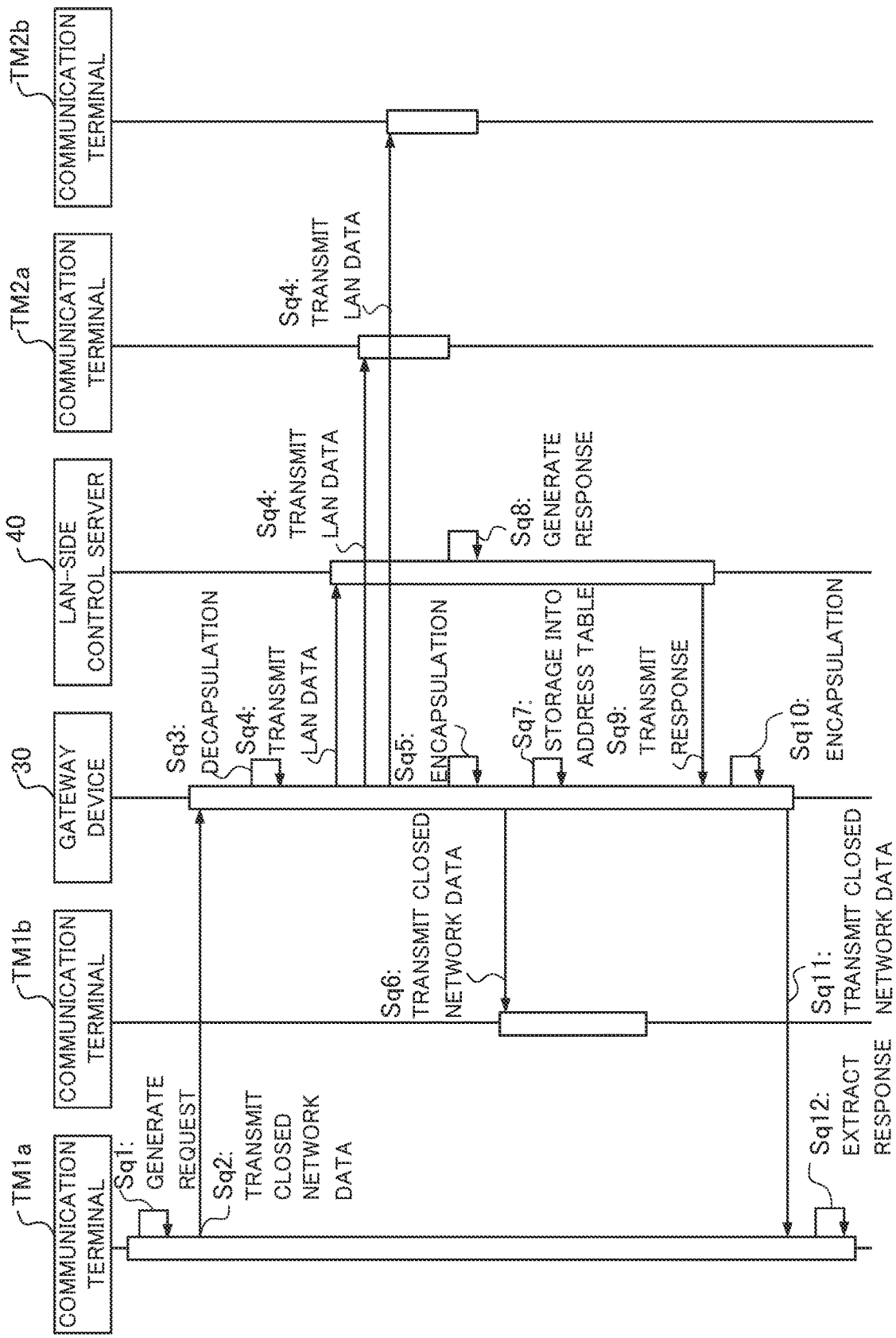
FIG. 8 is a sequence diagram illustrating an example of processing at the time of start of communication that the wireless system according to the embodiment performs.

After LTE tunnels were established as described above, transmission of an ARP request and an ARP response is performed in the wireless system 1, as illustrated in FIG. 8. The communication terminal TM1a transmits an ARP request requesting the MAC address of the LAN-side control server 40 in order to perform voice communication with the communication terminals TM2a and TM2b that are connected to the LAN 20. Specifically, the data generator 52 included in the communication terminal TM1a generates an ARP request packet (sequence Sq1). The ARP request packet is a packet that includes the ARP request in the data area of LAN data illustrated in FIG. 3. In the destination MAC address of the LAN data generated in sequence Sq1, a broadcast address is set.

The data generator 52 included in the communication terminal TM1a generates closed network data by encapsulating the ARP request packet and transmits the generated closed network data to the terminal-side communicator 53. As illustrated in FIG. 8, the terminal-side communicator 53 transmits the acquired closed network data to the closed network 10 (sequence Sq2). In the destination IP address of the LTE header included in the closed network data, the IP address in the LTE network of the gateway device 30 is set, and, in the source IP address of the LTE header, the IP address in the LTE network assigned to the communication terminal TM1a is set.

The closed network communicator 31 included in the gateway device 30 receives the closed network data from the communication terminal TM1a via the closed network 10 and transmits the received closed network data to the communication relay 32. The communication relay 32 generates LAN data by decapsulating the acquired closed network data (sequence Sq3). The communication relay 32 sends the generated LAN data to the LAN communicator 33. The LAN data generated in sequence Sq3 is an ARP request packet.

The LAN communicator 33 transmits the LAN data in a broadcast manner. Specifically, the LAN communicator 33 transmits the LAN data to each of the LAN-side control server 40 and the communication terminals TM2a and TM2b (sequence Sq4).

Since the LAN data generated in sequence Sq3 is an ARP request packet, the communication relay 32 generates closed network data to be transmitted to a communication terminal connected to the closed network 10 other than the communication terminal TM1a, that is, the communication terminal TM1b, by encapsulating the ARP request packet (sequence Sq5). The communication relay 32 sends the closed network data generated in sequence Sq5 to the closed network communicator 31. The closed network communicator 31 transmits the closed network data generated in sequence Sq5 to the communication terminal TM1b (sequence Sq6).

The communication relay 32 extracts the MAC address of the communication terminal TM1a and the port number assigned to the communication terminal TM1a from the LAN data generated in sequence Sq3. The communication relay 32 stores the port number indicating the tunnel TN1, which is an LTE tunnel established between the communication terminal TM1a and the gateway device 30, and the MAC address of the communication terminal TM1a in association with each other in the address table illustrated in FIG. 7 (sequence Sq7). Specifically, the communication relay 32 stores the source port number in the UDP header included in the LTE header and the source MAC address included in the LAN header in association with each other in the address table.

As illustrated in FIG. 8, the LAN-side control server 40 that has received the LAN data that are an ARP request packet, generates an ARP response packet (sequence Sq8). The ARP response packet is a packet that includes an ARP response in the data area of LAN data illustrated in FIG. 3. In the destination MAC address, the MAC address of the communication terminal TM1a, which is the transmission source of the ARP request packet, is set. As illustrated in FIG. 8, the LAN-side control server 40 transmits the ARP response packet generated in sequence Sq8 to the gateway device 30 (sequence Sq9).

The LAN communicator 33 included in the gateway device 30 receives the ARP response packet from the LAN-side control server 40. The LAN communicator 33 refers to the address table illustrated in FIG. 7. Since the destination MAC address set in the ARP response packet is stored in a record relating to the tunnel TN1, the LAN communicator 33 transmits the ARP response packet to the communication relay 32. The communication relay 32 generates closed network data to be transmitted to the communication terminal TM1a by encapsulating the ARP response packet (sequence Sq10). The communication relay 32, referring to the address table, sets the IP address in the LTE network assigned to the communication terminal TM1a in the destination IP address included in the LTE header of the closed network data. The communication relay 32 sends the closed network data generated in sequence Sq10 to the closed network communicator 31. The closed network communicator 31 transmits the closed network data generated in sequence Sq10 to the closed network 10 (sequence Sq11).

The terminal-side communicator 53 included in the communication terminal TM1a receives the closed network data and transmits the received closed network data to the data extractor 54. The data extractor 54 extracts the ARP response packet by decapsulating the closed network data (sequence Sq12). The data extractor 54 extracts the ARP response by removing the LAN header from the extracted ARP response packet.

The above-described operation causes the communication terminal TM1a to be registered in the LAN-side control server 40. As a result of the registration, the communication terminal TM1a appears to be connected to the LAN 20 in a similar manner to the communication terminals TM2a and TM2b when viewed from the LAN-side control server 40.

Figure 9:
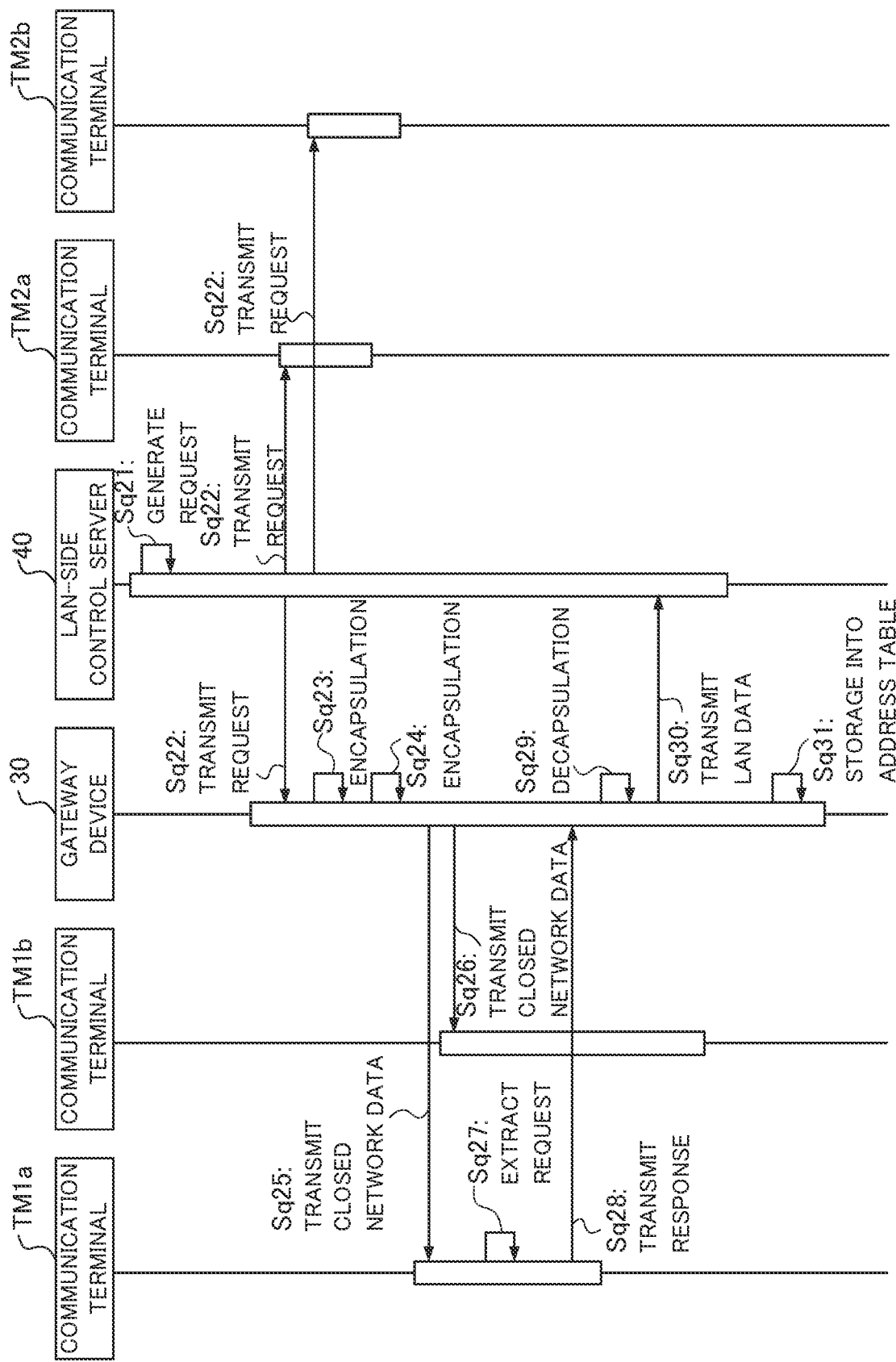
FIG. 9 is a sequence diagram illustrating another example of the processing at the time of start of the communication that the wireless system according to the embodiment performs.

Although, in the above-described example, an ARP request packet is transmitted from the communication terminal TM1a, the LAN-side control server 40 may transmit an ARP request packet requesting the MAC address of the communication terminal TM1a, as illustrated in FIG. 9.

Specifically, the LAN-side control server 40 generates an ARP request packet (sequence Sq21). The LAN-side control server 40 transmits the ARP request packet having the broadcast address set in the destination MAC address to the LAN 20. Specifically, the LAN-side control server 40 transmits the ARP request packet to each of the communication terminals TM2a and TM2b and the gateway device 30 (sequence Sq22).

When the LAN communicator 33 included in the gateway device 30 receives the ARP request packet, the LAN communicator 33 sends the ARP request packet to the communication relay 32 because the destination MAC address of the ARP request is the broadcast address. The communication relay 32 performs processing for transmitting the ARP request packet to parties on the other sides of the established LTE tunnels, that is, the communication terminals TM1a and TM1b. Specifically, the communication relay 32 generates closed network data to be transmitted to the communication terminal TM1a by encapsulating the ARP request packet (sequence Sq23). The communication relay 32 generates closed network data to be transmitted to the communication terminal TM1b by encapsulating the ARP request packet (sequence Sq24). The communication relay 32 transmits the generated closed network data to the closed network communicator 31.

The closed network communicator 31 transmits the closed network data that are generated in sequence Sq23 and addressed to the communication terminal TM1a to the closed network 10 (sequence Sq25). The closed network communicator 31 transmits the closed network data that are generated in sequence Sq24 and addressed to the communication terminal TM1b to the closed network 10 (sequence Sq26).

The terminal-side communicator 53 included in the communication terminal TM1a receives the closed network data and transmits the received closed network data to the data extractor 54. The data extractor 54 extracts the ARP request packet by decapsulating the closed network data (sequence Sq27). The data extractor 54 transmits the extracted ARP request packet to the data generator 52.

When the data generator 52 acquires the ARP request packet addressed to the terminal itself, the data generator 52 generates an ARP response packet, generates closed network data by encapsulating the ARP response packet, and transmits the generated closed network data to the terminal-side communicator 53. The terminal-side communicator 53 transmits the closed network data, which are generated by encapsulating the ARP response packet, to the closed network 10 (sequence Sq28).

The closed network communicator 31 included in the gateway device 30 receives the closed network data and transmits the received closed network data to the communication relay 32. The communication relay 32 generates LAN data by decapsulating the acquired closed network data (sequence Sq29). The LAN data generated in sequence Sq29 is an ARP response packet. Since the LAN data is an ARP response packet and the MAC address of the LAN-side control server 40 is set in the destination MAC address of the ARP response packet, the communication relay 32 sends the generated LAN data to the LAN communicator 33.

The LAN communicator 33 transmits the LAN data to the LAN-side control server 40 (sequence Sq30). The communication relay 32 extracts the MAC address of the communication terminal TM1a and the port number assigned to the communication terminal TM1a from the LAN data generated in sequence Sq29. The communication relay 32 stores the port number indicating the tunnel TN1, which is an LTE tunnel established between the communication terminal TM1a and the gateway device 30, and the MAC address of the communication terminal TM1a in association with each other in the address table illustrated in FIG. 7 (sequence Sq31). Specifically, the communication relay 32 stores the source port number in the UDP header included in the LTE header and the source MAC address included in the LAN header in association with each other.

When the addresses are resolved as described above, the communication terminal TM1a and the LAN-side control server 40 are able to generate LAN data including the MAC address of a desired party on the other side and perform communication.

As described above, according to the wireless system 1 according to the embodiment, the gateway device 30 decapsulating closed network data and encapsulating LAN data enables voice communication between the communication terminals TM1a and TM1b that are connected to the closed network 10, and the communication terminals TM2a and TM2b that are connected to the LAN 20. Since the gateway device 30 does not have to perform protocol conversion, the configuration of the gateway device 30 is simple.

Since, as described above, the gateway device 30 does not have to perform protocol conversion, processing in the gateway device 30 is simple. Therefore, there is no restriction caused by processing capacity of the gateway device 30 to the number of communication terminals to be connected to each of the closed network 10 and the LAN 20, to both of which the gateway device 30 is connected.

The present disclosure is not limited to the above-described embodiment.

Figure 10:
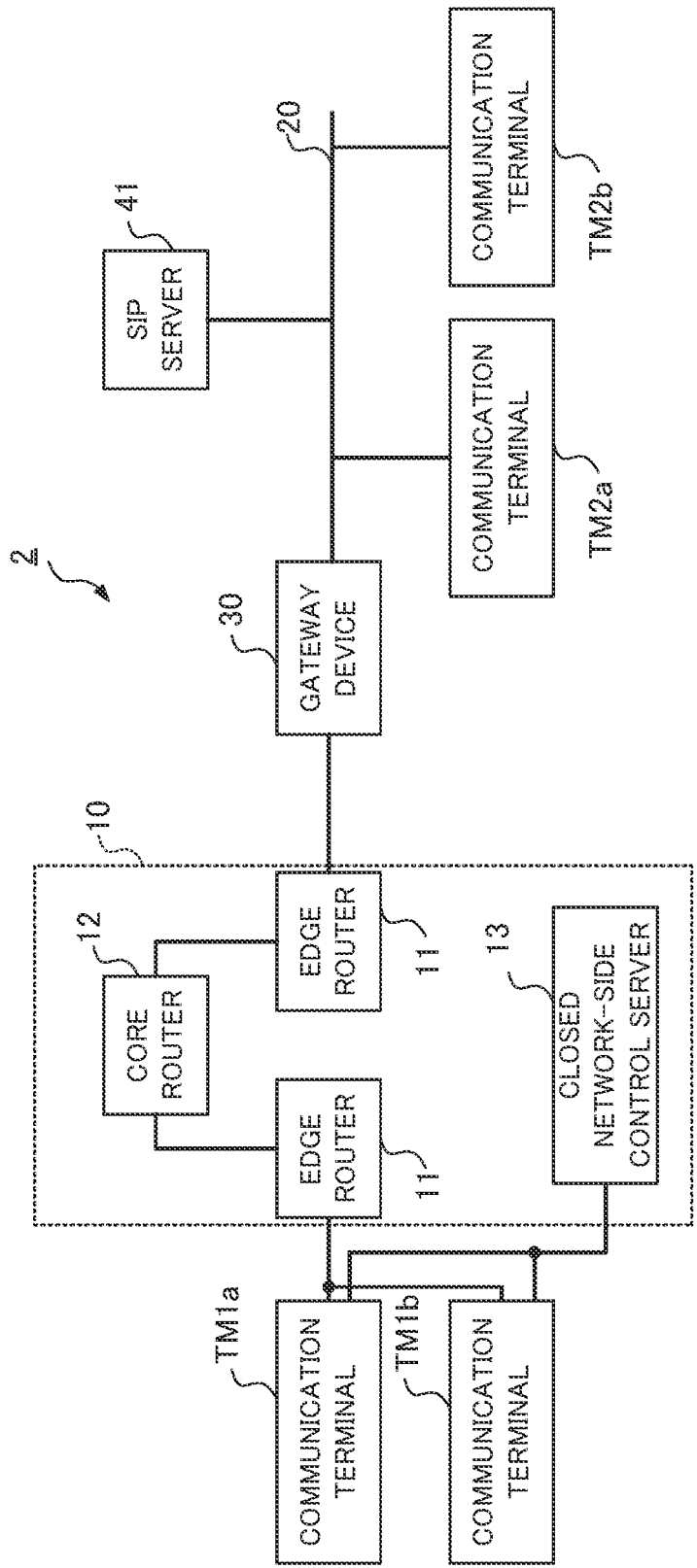
FIG. 10 is a block diagram illustrating a configuration of a first variation of the wireless system according to the embodiment.

As an example, communication terminals TM1a, TM1b, TM2a, and TM2b may perform voice communication, using the session initiation protocol (SIP). In this case, a wireless system 2 may include a SIP server 41 to be connected to a LAN 20, as illustrated in FIG. 10. Operation of a gateway device 30 is similar to that in the above-described embodiment. The communication terminals TM1a and TM1b are registered in the SIP server 41 by transmitting an ARP request requesting the MAC address of the SIP server 41 and receiving an ARP response via the gateway device 30.

An ARP request may be broadcast from the SIP server 41. Since the communication terminals TM1*a*, TM1*b*, TM2*a*, and TM2*b* virtually exist in the same network at the L2 level when the communication terminals TM1*a*, TM1*b*, TM2*a*, and TM2*b* are registered in the SIP server 41, when the communication terminals TM2*a* and TM2*b* are, for example, IP phones, the communication terminal TM2*a* is capable of making an extension call to not only the communication terminal TM2*b* that is connected to the LAN 20 as with the communication terminal TM2*a*, but also the communication terminals TM1*a* and TM1*b* that are connected to a closed network 10.

Each of the communication terminals TM1*a*, TM1*b*, TM2*a*, and TM2*b* is also capable of making an outside call through connection to a phone capable of making an outside call, via the SIP server 41.

Figure 11:
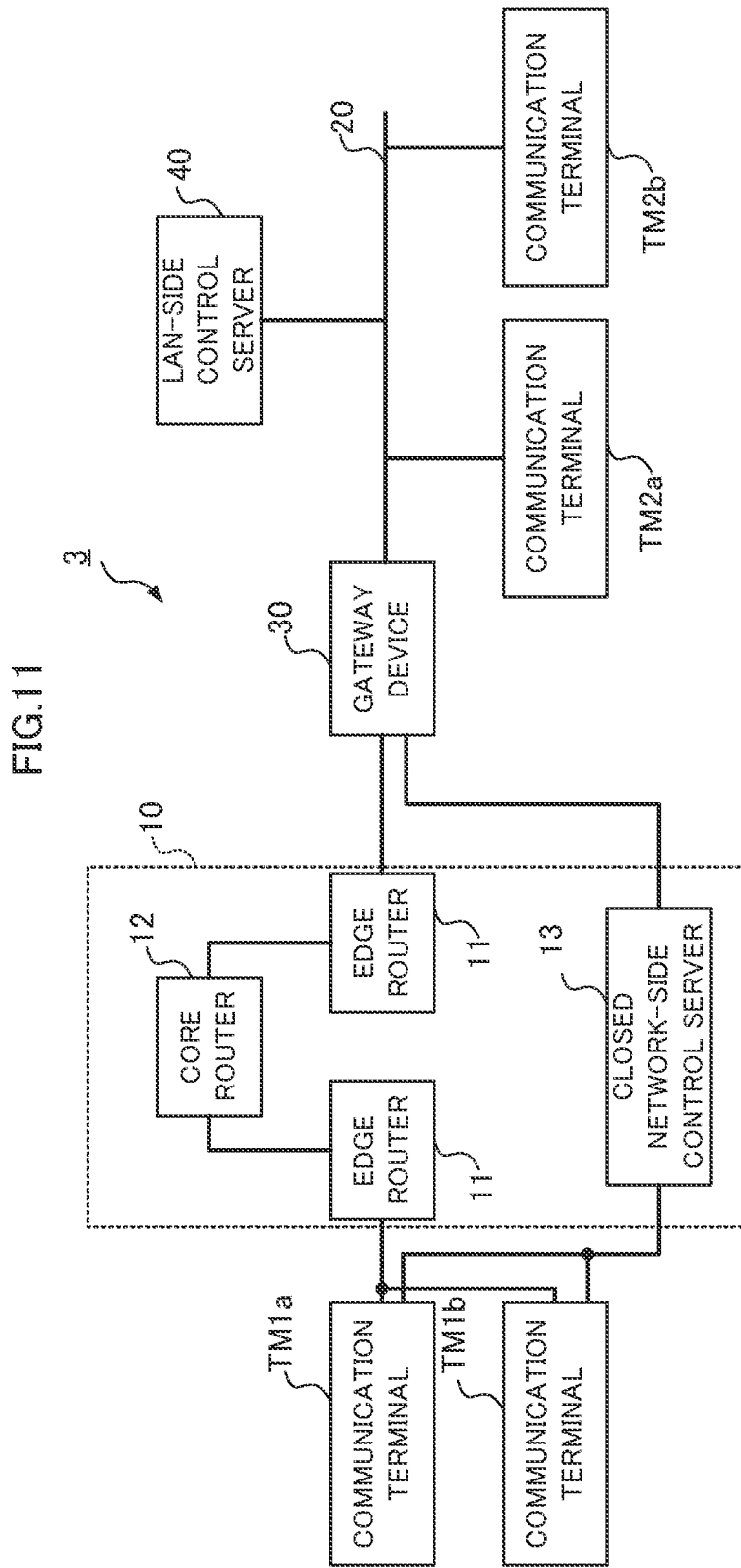
FIG. 11 is a block diagram illustrating a configuration of a second variation of the wireless system according to the embodiment.

As another example, each of communication terminals TM1*a*, TM1*b*, TM2*a*, and TM2*b* may have a function as an IP transceiver, specifically an LTE transceiver. In this case, the communication terminals TM1*a* and TM1*b* included in a wireless system 3 perform registration to a closed network-side control server 13, as illustrated in FIG. 11. The closed network-side control server 13 controls inter-wireless station communication that is communication between the communication terminals TM1*a* and TM1*b*, which operate as LTE transceivers. The closed network-side control server 13 controls communication between the communication terminals TM1*a* and TM1*b*, which operate as LTE transceivers, and the communication terminals TM2*a* and TM2*b*, which are connected to a LAN 20.

Figure 12:
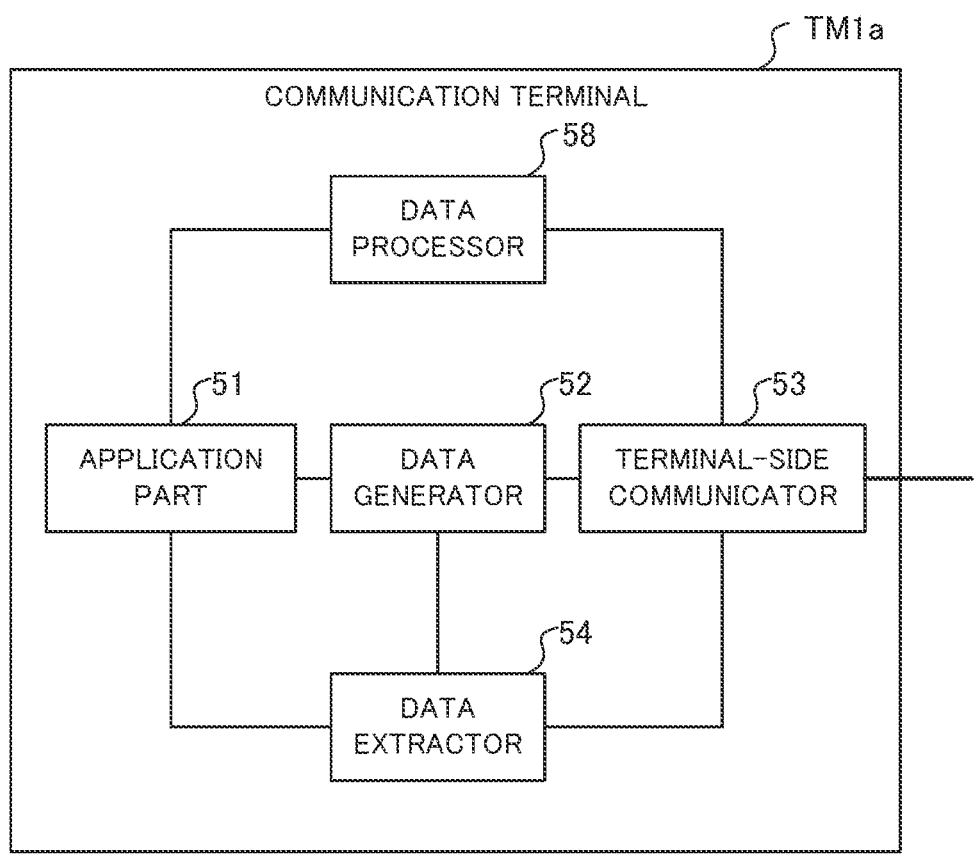
FIG. 12 is a block diagram illustrating a configuration of a first variation of the communication terminal according to the embodiment.

In this case, the communication terminal TM1*a* includes a data processor 58 to generate a real-time transport protocol (RTP) packet that is closed network data, based on data for transmission and extract received data from an RTP packet when the communication terminal TM1*a* operates as an LTE transceiver, in addition to the configuration of the communication terminal TM1*a* according to the embodiment, as illustrated in FIG. 12. The configuration of the communication terminal TM1*b* is the same as that of the communication terminal TM1*a*.

Specifically, the data processor 58 generates an RTP packet for performing communication with the closed network-side control server 13, based on data for transmission acquired from an application part 51. The data processor 58 transmits the generated RTP packet to a terminal-side communicator 53. The terminal-side communicator 53 transmits the RTP packet acquired from the data processor 58 to the closed network-side control server 13.

When the terminal-side communicator 53 acquires an RTP packet from the closed network-side control server 13, the terminal-side communicator 53 transmits the acquired RTP packet to the data processor 58. The data processor 58 extracts received data from the RTP packet acquired from the terminal-side communicator 53. The data processor 58 transmits the extracted received data to the application part 51.

The closed network-side control server 13 illustrated in FIG. 11 controls communication between the communication terminals TM1*a* and TM1*b* that operate as LTE transceivers. When the destination of an RTP packet acquired from the communication terminal TM1*a* or TM1*b* is the communication terminal TM2*a* or TM2*b*, which is connected to the LAN 20, the closed network-side control server 13 transmits the RTP packet to a gateway device 30.

A closed network communicator 31 included in the gateway device 30 communicates with the closed network-side control server 13 in, for example, a client-server method. When the closed network communicator 31 acquires an RTP packet from the closed network-side control server 13, the closed network communicator 31 transmits the acquired RTP packet to a communication relay 32. The communication relay 32 generates LAN data by performing protocol conversion on the RTP packet. Specifically, the communication relay 32 extracts an LTE payload from the RTP packet and generates LAN data that includes the LTE payload in the data area, that are addressed to the communication terminal TM2*a* or TM2*b*, and that have a configuration illustrated in FIG. 3. The communication relay 32 transmits the generated LAN data to a LAN communicator 33.

A port that the gateway device 30 uses for communication with the closed network-side control server 13 is different from a port that the gateway device 30 uses for communication with an edge router 11. Thus, the gateway device 30 may perform processing of protocol conversion or processing of encapsulation and decapsulation depending on a port used.

The LAN communicator 33 transmits the LAN data generated by the communication relay 32 to a LAN-side control server 40. The LAN-side control server 40 transmits the LAN data acquired from the gateway device 30 to the communication terminal TM2*a* or TM2*b* that is the destination of the LAN data.

When the LAN communicator 33 included in the gateway device 30 receives LAN data addressed to the communication terminal TM1*a* or TM1*b*, both of which are connected to a closed network 10, the LAN communicator 33 transmits the received LAN data to the communication relay 32. The communication relay 32 generates closed network data by performing protocol conversion on the LAN data. Specifically, the communication relay 32 extracts data from the data area of the LAN data and generates closed network data addressed to the communication terminal TM1*a* or TM1*b*. The communication relay 32 transmits the generated closed network data to the closed network communicator 31. The closed network communicator 31 transmits the closed network data to the closed network-side control server 13. The closed network-side control server 13 transmits the closed network data to the communication terminal TM1*a* or TM1*b* that is the destination of the closed network data.

The configurations of the communication terminals TM1*a*, TM1*b*, TM2*a*, and TM2*b* are not limited to the above-described examples. As an example, communication terminals TM2*a* and TM2*b* are not limited to wireless LAN transceivers connectable to the LAN 20 but may be any communication devices connectable to the LAN 20. As an example, the communication terminals TM2*a* and TM2*b* may be IP phones.

Although, in the above-described embodiment, it is assumed that the communication terminals TM1*a* and TM1*b* and the communication terminals TM2*a* and TM2*b* had different configurations, communication terminals TM1*a*, TM1*b*, TM2*a*, and TM2*b* may have the same configuration as one another. In this case, each of the communication terminals TM1*a*, TM1*b*, TM2*a*, and TM2*b* is a communication device that has the functions of the communication terminal TM1*a*, illustrated in FIG. 2, that can establish an LTE connection and the functions of the communication terminal TM2*a*, illustrated in FIG. 5, that can establish a LAN connection. Since the configurations of the communication terminals TM1*a*, TM1*b*, TM2*a*, and TM2*b* are the same as one another, the configuration of the communication terminal TM1a is described below.

Figure 13:
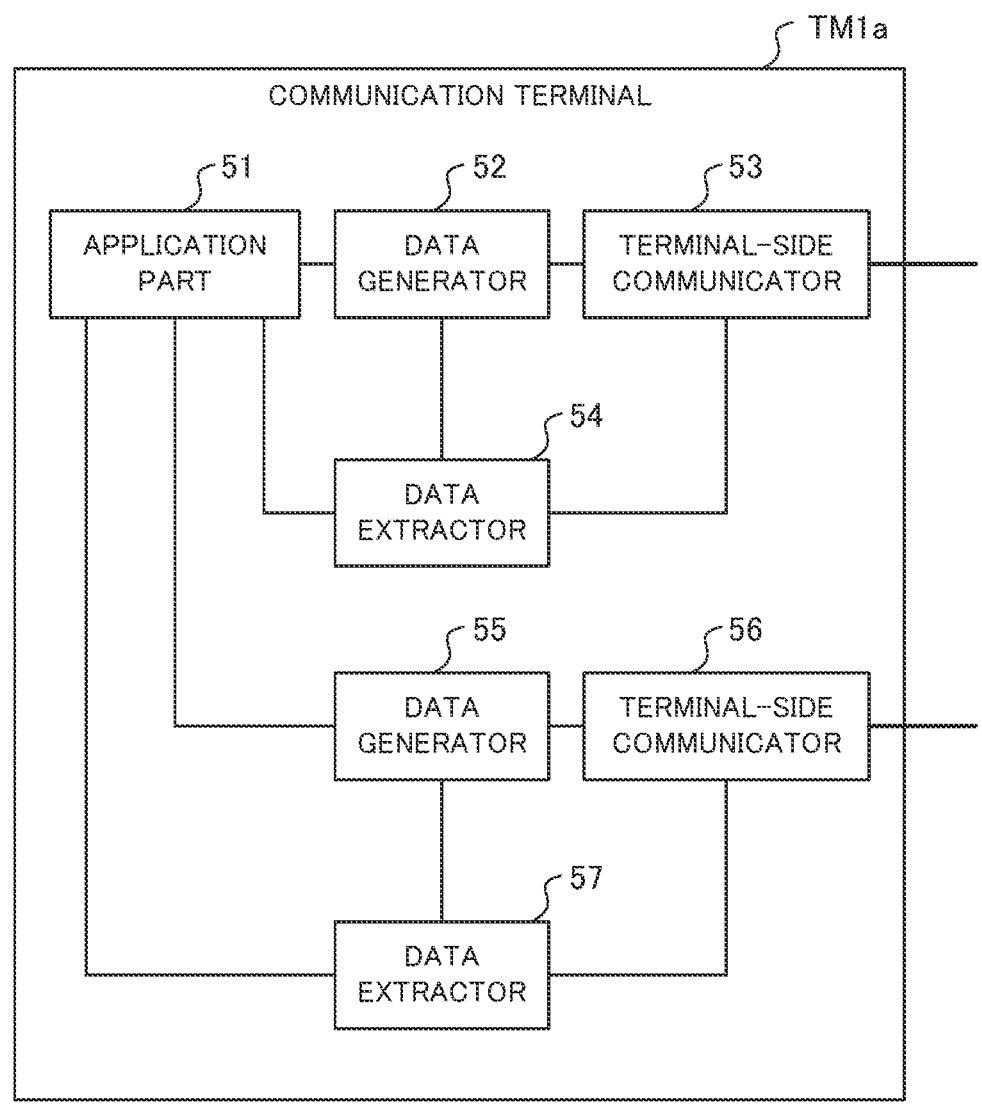
FIG. 13 is a block diagram illustrating a configuration of a second variation of the communication terminal according to the embodiment.

A communication terminal TM1a illustrated in FIG. 13, as with the communication terminal TM1a illustrated in FIG. 2, includes an application part 51, a data generator 52, a terminal-side communicator 53, and a data extractor 54. The communication terminal TM1a illustrated in FIG. 13, as with the communication terminal TM2a illustrated in FIG. 5, further includes a data generator 55, a terminal-side communicator 56, and a data extractor 57. The communication terminal TM1a is connected to a closed network 10 via the terminal-side communicator 53 or connected to a LAN 20 via the terminal-side communicator 56. The communication terminal TM1a illustrated in FIG. 13 and the communication terminals TM1b, TM2a, and TM2b that have the same configuration as the communication terminal TM1a illustrated in FIG. 13 may operate in the same manner as the communication terminal TM1a illustrated in FIG. 2 when connected to the closed network 10 and operate in the same manner as the communication terminal TM2a illustrated in FIG. 5 when connected to the LAN 20.

Each of the communication terminals TM1a, TM1b, TM2a, and TM2b may have a configuration enabling the communication terminal to use both RoIP connection and SIP connection. In this case, the wireless system 1 may include the SIP server 41 of the wireless system 2 illustrated in FIG. 10, in addition to the configuration in FIG. 1. Each of the communication terminals TM1a, TM1b, TM2a, and TM2b may connect to the closed network 10 or the LAN 20 through the RoIP connection or the SIP connection depending on an operation by the user, for example, depending on an application that the user uses.

Each of the communication terminals TM1a, TM1b, TM2a, and TM2b may automatically connect to the LAN 20 when the communication terminal is located in an area where the LAN 20 is usable and automatically connect to the closed network 10 when the communication terminal is located in an area where the LAN 20 is not usable.

The closed network 10 is provided on any public line. As an example, the closed network 10 may be provided on a fifth generation mobile communication network, a fourth generation mobile communication network, or a third generation mobile communication network.

Figure 14:
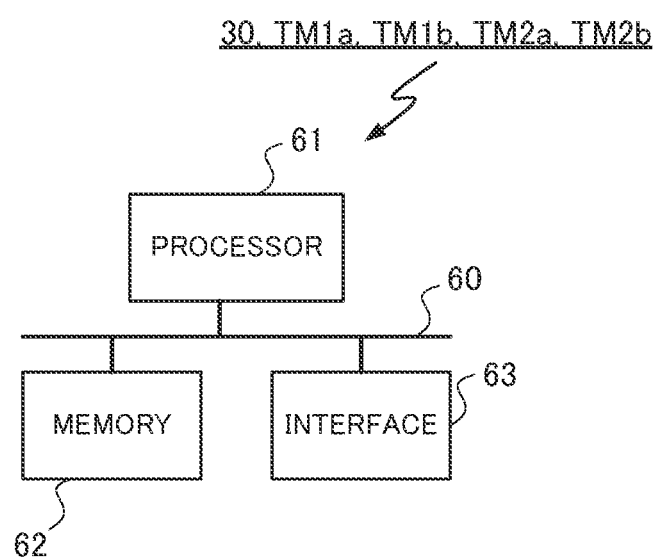
FIG. 14 is a block diagram illustrating a hardware configuration of the gateway device and the communication terminal according to the embodiment of the present disclosure.

Each of the gateway device 30 and the communication terminals TM1a, TM1b, TM2a, and TM2b described above includes a processor 61, a memory 62, and an interface 63 as a hardware configuration to control respective functional components, as illustrated in FIG. 14. The processor 61, the memory 62, and the interface 63 are connected to one another by a bus 60.

For example, respective functions of each of the gateway device 30 and the communication terminals TM1a, TM1b, TM2a, and TM2b are achieved by the processor 61 executing programs stored in the memory 62.

For example, the interface 63 is a component to connect the gateway device 30 to the closed network 10 and the LAN 20 and establish communication therebetween. Specifically, the gateway device 30 included in the wireless system 1 is connected to the LAN 20 and one of the edge routers 11 in the closed network 10 via the interface 63 of the gateway device 30. For example, the communication terminal TM1a is connected to the other of the edge routers 11 in the closed network 10 via the interface 63 of the communication terminal TM1a. The interface 63 has a plurality of types of interface modules as needed basis.

Although, in FIG. 14, each of the gateway device 30 and the communication terminals TM1a, TM1b, TM2a, and TM2b has one processor 61 and one memory 62, each of the gateway device 30 and the communication terminals TM1a, TM1b, TM2a, and TM2b may have a plurality of processors 61 and a plurality of memories 62. In this case, the respective functions of each of the gateway device 30 and the communication terminals TM1a, TM1b, TM2a, and TM2b may be executed by the plurality of processors 61 and the plurality of memories 62 cooperating with one another.

Figure 15:
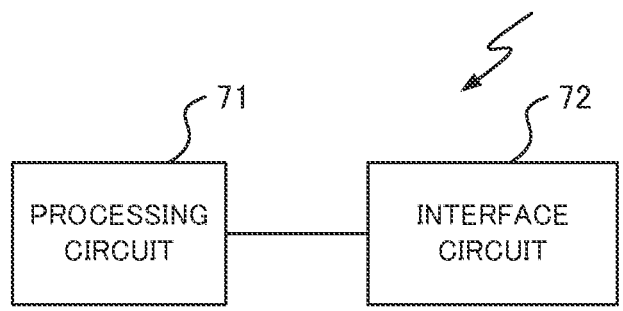
FIG. 15 is a block diagram illustrating a variation of the hardware configuration of the gateway device and the communication terminal according to the embodiment of the present disclosure.

Each of the gateway device 30 and the communication terminals TM1a, TM1b, TM2a, and TM2b may be achieved by a processing circuit 71, as illustrated in FIG. 15. The processing circuit 71 is connected to another device via an interface circuit 72. For example, the gateway device 30 is connected to one of the edge routers 11 in the closed network 10 and the LAN 20 via the interface circuit 72 of the gateway device 30. For example, the communication terminal TM1a is connected to the other of the edge routers 11 in the closed network 10 via the interface circuit 72 of the communication terminal TM1a.

When the processing circuit 71 is dedicated hardware, the processing circuit 71 has a single circuit, a composite circuit, a processor, an application specific integrated circuit (ASIC), a field programmable gate array (FPGA), or a combination thereof. Respective functional components of each of the gateway device 30 and the communication terminals TM1a, TM1b, TM2a, and TM2b may be achieved by individual processing circuits 71, or the respective functional components of each of the gateway device 30 and the communication terminals TM1a, TM1b, TM2a, and TM2b may be achieved by a common processing circuit 71.

For example, each of the application part 51, the data generator 52, the terminal-side communicator 53, and the data extractor 54 that are included in the communication terminal TM1a may be achieved by an individual processing circuit 71, or the application part 51, the data generator 52, the terminal-side communicator 53, and the data extractor 54 may be achieved by a common processing circuit 71.

Some of the respective functions of each of the gateway device 30 and the communication terminals TM1a, TM1b, TM2a, and TM2b may be achieved by dedicated hardware, and the other functions may be achieved by software or firmware. For example, in the communication terminal TM1a, the application part 51 and the data generator 52 may be achieved by the processor 61 illustrated in FIG. 14 reading and executing programs stored in the memory 62 and the terminal-side communicator 53 and the data extractor 54 may be achieved by the processing circuit 71 illustrated in FIG. 15.

Additionally, the hardware configurations and the flowcharts described above are only examples and can be changed and modified arbitrarily.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

This application claims the benefit of Japanese Patent Application No. 2020-166380, filed on Sep. 30, 2020, the entire disclosure of which is incorporated by reference herein.

REFERENCE SIGNS LIST 1, 2, 3 Wireless system
10 Closed network
11 Edge router
12 Core router
13 Closed network-side control server
20 LAN
30 Gateway device
31 Closed network communicator
32 Communication relay
33 LAN communicator
40 LAN-side control server
41 SIP server
51 Application part
52, 55 Data generator
53, 56 Terminal-side communicator
54, 57 Data extractor
58 Data processor
60 Bus
61 Processor
62 Memory
63 Interface
71 Processing circuit
72 Interface circuit
TM1a, TM1b, TM2a, TM2b Communication terminal

The invention claimed is:

1. A wireless system comprising:
a gateway device for relaying voice communication between a closed network-side communication terminal to be connected to a closed network on a public line and a LAN-side communication terminal to be connected to a local area network, the gateway device comprising:
   a closed network interface circuit connected to the closed network and configured to perform transmission and reception of closed network data conforming to a communication standard of the closed network;
   a LAN interface circuit connected to the local area network and configured to perform transmission and reception of LAN data conforming to a communication standard of the local area network; and
   a communication relay to generate the closed network data by performing encapsulation by adding a header for communication in the closed network to the LAN data received by the LAN interface circuit and generate the LAN data by performing decapsulation by removing a header for communication in the closed network from the closed network data received by the closed network interface circuit, wherein
   the closed network interface circuit transmits the closed network data generated by the communication relay to the closed network,
   the LAN interface circuit transmits the LAN data generated by the communication relay to the local area network, and
   the communication relay is embodied with a processing circuit contained in the gateway device,
a closed network-side communication terminal that is (i) a communication terminal connectable to a closed network on a public line and configured to communicate with a communication terminal to be connected to the closed network or a communication terminal to be connected to a local area network that is connected to the closed network via a gateway device and (ii) to be connected to the gateway device via a closed network on a public line;
a closed network-side control server to perform communication control in the closed network;
a LAN-side communication terminal that is a communication terminal connected to the local area network that is connected to the gateway device and configured to perform voice communication with the closed network-side communication terminal; and
a LAN-side control server to perform communication control in the local area network,
the closed network-side communication terminal including
   a terminal-side interface circuit connected to the closed network and configured to perform transmission and reception of closed network data conforming to a communication standard of the closed network,
   a data generator to generate LAN data conforming to a communication standard of the local area network, based on data for transmission and generate the closed network data by performing encapsulation by adding the header for communication in the closed network to the LAN data,
   a data extractor to generate the LAN data by performing decapsulation by removing a header for communication in the closed network from the closed network data received by the terminal-side interface circuit and extract received data from the LAN data, and
   the data generator and the data extractor are embodied with a processing circuit contained in the closed network-side communication terminal, wherein
the terminal-side interface circuit transmits the closed network data generated by the data generator to the closed network,
the LAN-side control server performs communication control on the closed network-side communication terminal via the encapsulation/the decapsulation performed by the gateway device,
the LAN-side control server performs communication control on the LAN-side communication terminal directly,
when the closed network-side communication terminal is started, the closed network-side communication terminal acquires network information for performing communication with the LAN-side control server, which serves as a destination of the registration, from the closed network-side control server, and
the closed network-side communication terminal
   is connected to the LAN-side control server using the network information,
   is registered in the LAN-side control server, and
   acquires, from the LAN-side control server, provisioning data that are information for enabling communication with another communication terminal.

2. The wireless system according to claim 1, wherein the terminal-side interface circuit transmits the closed network data generated by the data generator to an edge router of the closed network.

3. The wireless system according to claim 1,
wherein the communication relay performs the decapsulation on the closed network data transmitted from the closed network-side communication terminal connected to the closed network via an edge router of the closed network, and the communication relay performs the encapsulation on the LAN data addressed to the closed network-side communication terminal connected to the edge router of the closed network.

4. The wireless system according to claim 2,
wherein the communication relay performs the decapsulation on the closed network data transmitted from the closed network-side communication terminal connected to the closed network via an edge router of the closed network, and
the communication relay performs the encapsulation on the LAN data addressed to the closed network-side communication terminal connected to the edge router of the closed network.

5. The wireless system according to claim 1, wherein the communication relay performs the encapsulation by adding the header for communication in the closed network, the header including a destination Internet protocol (IP) address, a source IP address, and a user datagram protocol (UDP) header.

6. The wireless system according to claim 2, wherein the communication relay performs the encapsulation by adding the header for communication in the closed network, the header including a destination Internet protocol (IP) address, a source IP address, and a user datagram protocol (UDP) header.

7. The wireless system according to claim 3, wherein the communication relay performs the encapsulation by adding the header for communication in the closed network, the header including a destination Internet protocol (IP) address, a source IP address, and a user datagram protocol (UDP) header.

8. The wireless system according to claim 4, wherein the communication relay performs the encapsulation by adding the header for communication in the closed network, the header including a destination Internet protocol (IP) address, a source IP address, and a user datagram protocol (UDP) header.

9. The wireless system according to claim 5 further comprising a data processor to generate the LAN data by performing protocol conversion on the closed network data received by the closed network interface circuit and generate the closed network data by performing protocol conversion on the LAN data received by the LAN interface circuit,
wherein the data processor generates the LAN data by performing protocol conversion on the closed network data with respect to the closed network data transmitted from a wireless station that is the closed network-side communication terminal connected to the closed network via the closed network-side control server on the closed network and configured to control inter-wireless station communication.

10. The wireless system according to claim 6 further comprising a data processor to generate the LAN data by performing protocol conversion on the closed network data received by the closed network interface circuit and generate the closed network data by performing protocol conversion on the LAN data received by the LAN interface circuit,
wherein the data processor generates the LAN data by performing protocol conversion on the closed network data with respect to the closed network data transmitted from a wireless station that is the closed network-side communication terminal connected to the closed network via the closed network-side control server on the closed network and configured to control inter-wireless station communication.

11. A relay method performed by a wireless system including:
a closed network-side communication terminal that is a communication terminal to be connected to a closed network on a public line;
a LAN-side communication terminal that is a communication terminal to be connected to a local area network;
a gateway device to relay voice communication between the closed network-side communication terminal and the LAN-side communication terminal;
a closed network-side control server to perform communication control in the closed network; and
a LAN-side control server to perform communication control in the local area network,
the relay method comprising:
by the closed network-side communication terminal, when the closed network-side communication terminal is started, acquiring network information for performing communication with the LAN-side control server, which serves as a destination of the registration, from the closed network-side control server;
by the closed network-side control server, performing communication control in the closed network;
by the LAN-side control server, performing communication control on the closed network-side communication terminal via encapsulation/decapsulation performed by the gateway device in the local area network;
by the LAN-side control server, performing communication control on the LAN-side communication terminal in the local area network directly;
by the gateway device, receiving LAN data conforming to a communication standard of the local area network from the local area network, generating closed network data conforming to a communication standard of the closed network by performing encapsulation by adding a header for communication in the closed network to the received LAN data, and transmitting the generated closed network data to the closed network; and
by the gateway device, receiving the closed network data from the closed network, generating the LAN data by performing decapsulation by removing a header for communication in the closed network from the received closed network data, and transmitting the generated LAN data to the local area network,
connecting the closed network-side communication terminal to the LAN-side control server using the network information,
registering the closed network-side communication terminal to the LAN-side control server, and
by the closed network-side communication terminal, acquiring, from the LAN-side control serve, provisioning data that are information for enabling communication with another communication terminal.

12. A communication terminal connectable to a closed network on a public line and configured to communicate with a communication terminal to be connected to the closed network or a communication terminal to be connected to a local area network that is connected to the closed network via a gateway device, the communication terminal comprising:
a terminal-side interface circuit connected to the closed network and configured to perform transmission and reception of closed network data conforming to a communication standard of the closed network;
a data generator to generate LAN data conforming to a communication standard of the local area network, based on data for transmission and generate the closed network data by performing encapsulation by adding a header for communication in the closed network to the LAN data; and a data extractor to generate the LAN data by performing decapsulation by removing a header for communication in the closed network from the closed network data received by the terminal-side interface circuit and extract received data from the LAN data, wherein the data generator and the data extractor are embodied with a processing circuit contained in the communication terminal, the terminal-side interface circuit transmits the closed network data generated by the data generator to the closed network, the communication terminal connectable to the closed network is subjected to communication control by a LAN-side control server via encapsulation/decapsulation performed by the gateway device, the communication terminal to be connected to the local area network is subjected to direct communication control by the LAN-side control server, when the communication terminal connectable to the closed network is started, the communication terminal to be connected to the local area network acquires network information for performing communication with the LAN-side control server, which serves as a destination of the registration, from a closed network-side control server, and the communication terminal to be connected to the local area network
is connected to the LAN-side control server using the network information,
is registered in the LAN-side control server, and
acquires, from the LAN-side control serve, provisioning data that are information for enabling communication with another communication terminal.

13. The communication terminal according to claim 12, wherein
the terminal-side interface circuit transmits the closed network data generated by the data generator to an edge router of the closed network.

14. The wireless system according to claim 1, wherein
the closed network interface circuit
communicates with an edge router using a port that is associated to the edge router, and
communicates with the closed network-side control server that is provided in the closed network using a port, which is different from the port associated to the edge router, that is associated to the closed network-side control server that controls the inter-wireless station communication, the communication relay generates the LAN data by performing the decapsulation on the closed network data received by the closed network interface circuit at the port associated to the edge router, and by performing protocol conversion on the closed network data received by the closed network interface circuit at the port associated to the closed network-side control server, the communication relay generates the closed network data by performing the encapsulation on the LAN data addressed to the closed network-side communication terminal connected to the edge router of the closed network, and by performing protocol conversion on the LAN data addressed to the closed network-side communication terminal connected via the closed network-side control server.

15. The relay method according to claim 11, wherein
the gateway device includes a closed network interface circuit and a communication relay,
the closed network interface circuit
communicates with an edge router using a port that is associated to the edge router, and
communicates with the closed network-side control server that is provided in the closed network using a port, which is different from the port associated to the edge router, that is associated to the closed network-side control server that controls the inter-wireless station communication, the communication relay generates the LAN data by performing the decapsulation on the closed network data received by the closed network interface circuit at the port associated to the edge router, and by performing protocol conversion on the closed network data received by the closed network interface circuit at the port associated to closed network-side the control server, the communication relay generates the closed network data by performing the encapsulation on the LAN data addressed to the closed network-side communication terminal connected to the edge router of the closed network, and by performing protocol conversion on the LAN data addressed to the closed network-side communication terminal connected via the closed network-side control server.

* * * * *